(12) United States Patent
Herter (10) Patent No.: US 12,203,585 B1
(45) Date of Patent: Jan. 21, 2025

(54) ADJUSTABLE TUBULAR PIPE INSULATOR

(71) Applicant: John Frederick Herter, Lincolnton, NC (US)

(72) Inventor: John Frederick Herter, Lincolnton, NC (US)

( * ) Notice: Subject to any disclaimer, the term of this patent is extended or adjusted under 35 U.S.C. 154(b) by 349 days.

(21) Appl. No.: 18/048,842

(22) Filed: Oct. 22, 2022

Related U.S. Application Data (63) Continuation-in-part of application No. 16/900,333, filed on Jun. 12, 2020, now abandoned.

(60) Provisional application No. 63/000,663, filed on Mar. 27, 2020.

(51) Int. Cl.
*F16L 59/02* (2006.01)
*F16L 59/14* (2006.01)

(52) U.S. Cl.
CPC .............. *F16L 59/022* (2013.01); *F16L 59/14* (2013.01)

(58) Field of Classification Search
CPC ....................................................... F16L 59/02
USPC .......................... 138/149, 128, 155, 161, 169
See application file for complete search history.

(56) References Cited

U.S. PATENT DOCUMENTS

| | | | | |
|---|---|---|---|---|
| 3,289,702 | A | * | 12/1966 | Sherburne ............... F16L 59/14 138/155 |
| 3,451,661 | A | * | 6/1969 | Barker ..................... F27D 3/022 138/155 |
| 4,228,826 | A | * | 10/1980 | Campbell, Jr. ........ F27D 1/0043 138/155 |
| 6,752,176 | B1 | * | 6/2004 | Price ..................... F16L 59/166 285/47 |
| 8,261,558 | B2 | * | 9/2012 | Cao ........................ F16L 59/026 62/50.7 |
| 8,658,264 | B2 | * | 2/2014 | Cao ........................... B32B 7/05 62/50.7 |
| 2002/0100517 | A1 | * | 8/2002 | Somerville .......... F24F 13/0263 138/155 |

* cited by examiner

*Primary Examiner* — Patrick F Brinson
(74) *Attorney, Agent, or Firm* — The Van Winkle Law Firm; William G. Heedy (57) ABSTRACT

An adjustable tubular insulator, such as for insulating a pipe, has a body having a width, a thickness, a length, and a longitudinal slit extending the length of the body. The width and the thickness define a first inner diameter. The body is sized and configured for engaged receipt of a first pipe size having first outer diameter. The body has first and second longitudinal seams at first and second predetermined distances from the longitudinal slit. The first and second longitudinal seams demark first and second detachable insulator strips having different predetermined widths. One or both of the detachable insulator strips may be selectively removed or repositioned to reduce the width of the body such that the body is sized and configured for engaged receipt of a second pipe size, the second pipe size having an outer diameter less than the first outer diameter.

20 Claims, 13 Drawing Sheets

ADJUSTABLE TUBULAR PIPE INSULATOR

RELATED APPLICATION

This application is a continuation-in-part of U.S. patent application Ser. No. 16/900,333 filed Jun. 12, 2020, and claims the benefit of U.S. Provisional Patent Application Ser. No. 63/000,663 filed on Mar. 27, 2020, both of which are hereby incorporated herein by reference.

FIELD OF THE INVENTION

The present invention relates to tubular foam pipe insulation and, more particularly, to pipe insulation having an adjustable size.

BACKGROUND OF THE INVENTION

Currently, pipe insulation, particularly foam pipe insulation, is only sold to fit specific sizes of pipes, so the seller must have many sizes in stock. Foam pipe insulation is a very low-cost item yet consumes shelf space that might otherwise be used for higher revenue items. Keeping a variety of sizes in stock requires a significant amount of shelf space.

Moreover, a plumbing contractor needs a case of each size of insulator on his truck, requiring a large amount of truck space, or the contractor must make several trips to a hardware store. The end user also must know the exact size of each pipe to be insulated or purchase multiple sizes with the intention of returning the incorrectly sized insulators.

Accordingly, there exists a need for an adjustable foam pipe insulator for fitting a plurality of differently sized diameters of pipes.

SUMMARY OF THE INVENTION

In accordance with one form of the present invention, an adjustable tubular pipe insulator is provided for fitting a plurality of differently sized diameters of pipes. In accordance with one embodiment, the adjustable pipe insulator is sized and configured to fit at least the three industry standard diameter sizes of pipes. The inventive adjustable tubular pipe insulator allows a retailer to generally only stock one size of tubular pipe insulation instead of at least the three most popular sizes. The single size of insulation, with one Universal Product Code (UPC) and one inventory number, potentially saves retailers up to ⅔ shelf space, makes inventory maintenance simpler, and saves shipping costs. The invention simplifies planning and reduces costs for plumbers and end users who generally will only need to know the number of units required rather than the number of each size unit required.

In accordance with another form of the present invention, an adjustable pipe insulator is provided for a pipe, the adjustable tubular insulator including a main body having a width extending between a first end and a second end, the main body being formed from foam; a longitudinal slit formed by the main body, the longitudinal slit being sized and configured for engaged receipt of the pipe by the main body; and a plurality of longitudinal seams at the second end of the main body, the plurality of longitudinal seams demarking a plurality of detachable insulator strips having predetermined widths; and wherein one or more of the plurality of insulator strips may be selectively removed by a user along a corresponding one of the plurality of longitudinal seams to reduce the width of the main body such that the main body is sized for congruent abutment about the pipe.

In accordance with another form of the present invention, an adjustable pipe insulator is provided for a pipe, the adjustable tubular insulator including a main body having a width extending between a first end and a second end; a longitudinal slit formed by the main body, the longitudinal slit being sized and configured for engaged receipt of the pipe by the main body; and a plurality of longitudinal seams at the second end of the main body, the plurality of longitudinal seams demarking a plurality of detachable insulator strips having predetermined widths; and wherein one or more of the plurality of insulator strips may be selectively removed by a user along a corresponding one of the plurality of longitudinal seams to reduce the width of the main body such that the main body is sized for congruent abutment about the pipe.

In accordance with another form of the present invention, an adjustable tubular insulator, such as for insulating a pipe, has a body having a width, a thickness, a length, and a longitudinal slit extending the length of the body. The width and the thickness define a first inner diameter. The body is sized and configured for engaged receipt of a first pipe size having first outer diameter. The body has first and second longitudinal seams at first and second predetermined distances from the longitudinal slit. The first and second longitudinal seams demark first and second detachable insulator strips having different predetermined widths. One or both of the detachable insulator strips may be selectively removed to reduce the width of the body such that the body is sized and configured for engaged receipt of a smaller pipe size, the smaller pipe size having an outer diameter less than the first outer diameter.

In accordance with another form of the present invention, an adjustable tubular insulator, such as for insulating a pipe, has a body having a width, a thickness, a length, and a longitudinal slit extending the length of the body. The width and the thickness define a first inner diameter. The body is sized and configured for engaged receipt of a first pipe size having first outer diameter. The body has first and second longitudinal seams at first and second predetermined distances from the longitudinal slit. The first and second longitudinal seams demark first and second detachable insulator strips having different predetermined widths. One or both of the detachable insulator strips may be selectively repositioned inside the body to reduce the width of the body such that the body is sized and configured for engaged receipt of a smaller pipe size, the smaller pipe size having an outer diameter less than the first outer diameter.

BRIEF DESCRIPTION OF THE DRAWINGS

For a fuller understanding of the nature of the present invention, reference should be made to the following detailed description, taken in conjunction with the accompanying drawings in which.

Like reference numerals refer to like parts throughout the several views of the drawings.

DETAILED DESCRIPTION OF THE PREFERRED EMBODIMENTS

While implementations are described herein by way of example, those skilled in the art will recognize that the implementations are not limited to the examples or drawings described. It should be understood that the drawings and detailed description thereto are not intended to limit implementations to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims. Referring to the several views of the drawings, the adjustable tubular pipe insulator is shown and described herein and is generally indicated as 10.

Broadly, an embodiment of the present invention provides an adjustable tubular pipe insulator 10 with removable strips to adapt to a variety of pipe sizes. The adjustable tubular pipe insulator 10 may be primarily formed from any suitable material for insulating, such as, but not limited to, polyethylene foam and rubber.

The adjustable tubular foam insulator 10 includes a main body 12 which may be manufactured by extrusion using any suitable material, such as but not limited to any form of polyethylene foam and/or any form of rubber. The material may be selected, in part, based upon the operational temperature of the pipe to be insulated. The main body 12 may be formed with a longitudinal gap or slit 14 extending the length of the main body 12 of the adjustable tubular pipe insulator 10. In some embodiments, the main body 12 may be provided with an adhesive strip 20 to seal the slit 14 after the insulator 10 is installed over a pipe 10.

A plurality of longitudinal seams or perforations parallel to the longitudinal slit may be provided, for example, during the extrusion process after the foam has cooled by way of one or more small blades. The seams generally do not penetrate the insulation completely. The distance between each seam may be predetermined to size the tubular insulation to fit around preselected pipe sizes. The end user may tear the insulation at one or more seams to remove one or more strips of foam adjacent to the slit to fit a smaller diameter pipe.

The adjustable tubular pipe insulator 10 may be manufactured for, and/or adaptable to, a variety of sizes of tubing and pipes 100 ranging from an outer diameter of about ¼" to an outer diameter of about 2½". Preferably, the adjustable tubular pipe insulator 10 may be adjustable for at least 0.5-inch, 0.75-inch and 1-inch pipe 100 installation.

Figure 1:
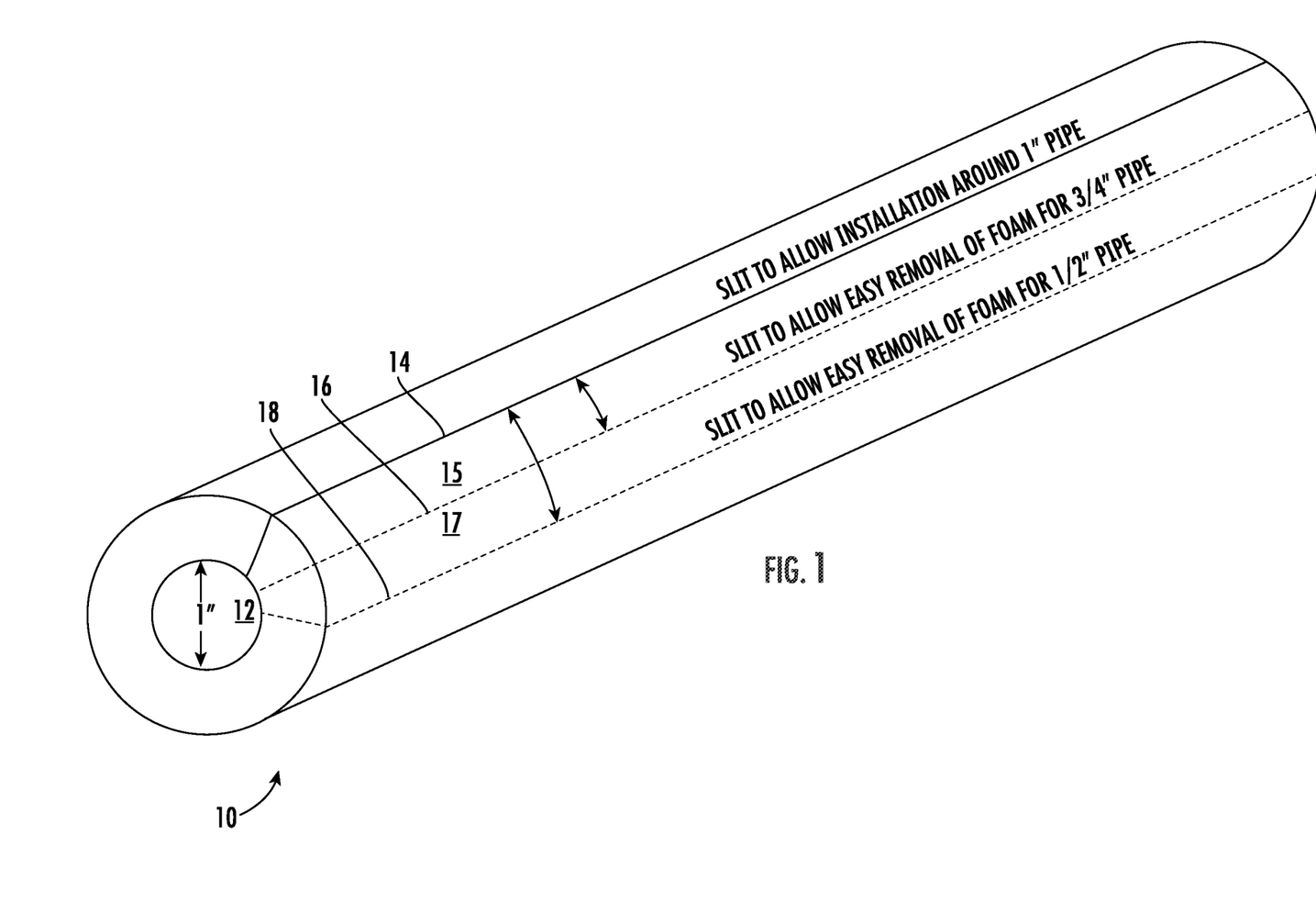
FIG. 1 is a perspective schematic view illustrating the adjustable tubular pipe insulator according to one embodiment of the invention.
Figure 2:
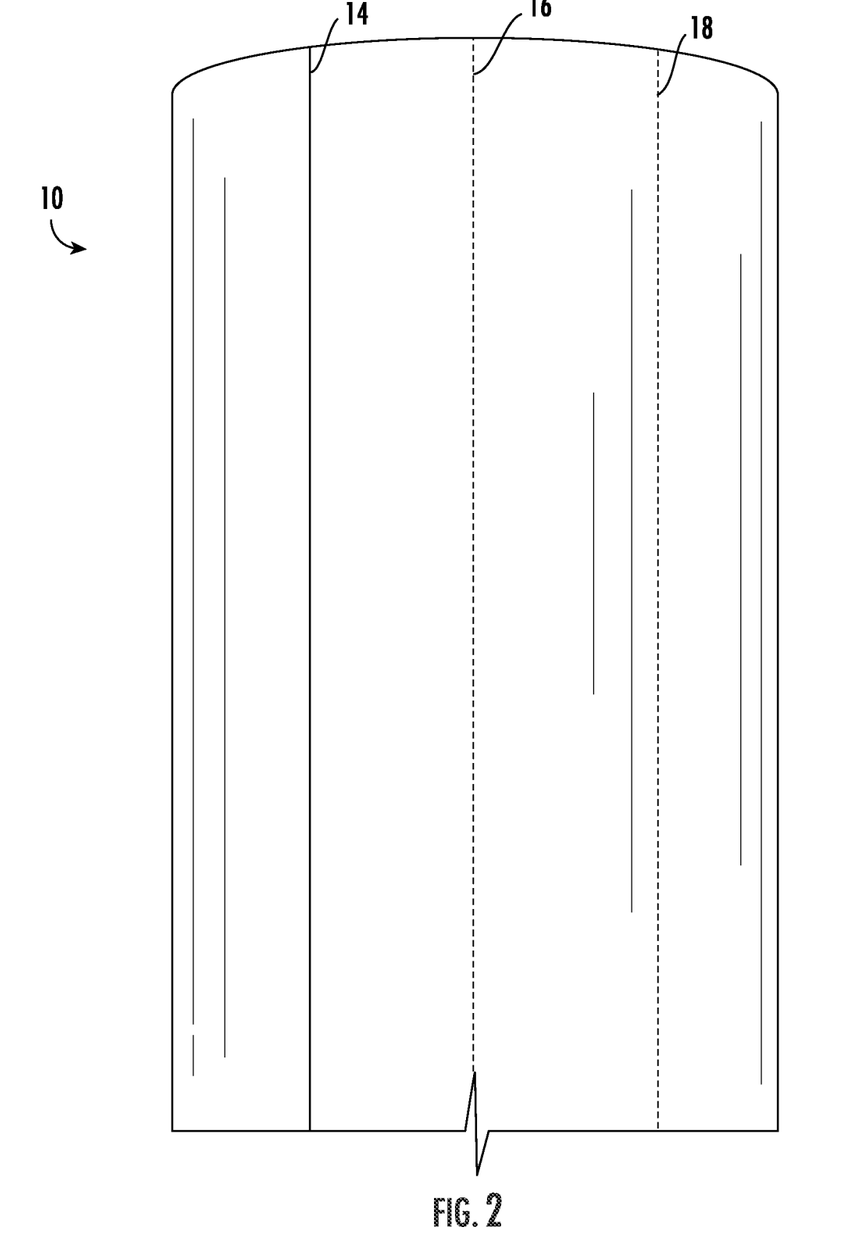
FIG. 2 is an enlarged photographic view of one end thereof.

Referring now to FIGS. 1-2, the Figures illustrate the adjustable tubular pipe insulator 10 according to one embodiment of the invention. FIG. 1 illustrates the placement of longitudinal seams 16, 18 parallel to a longitudinal slit and spaced to accommodate smaller pipe diameters. For example, in FIG. 1, the slit 14 and a first seam 16 are about ¼" apart and the first seam 16 and a second seam 18 are about ¼" apart. FIG. 2 is an enlarged view thereof.

Figure 3:
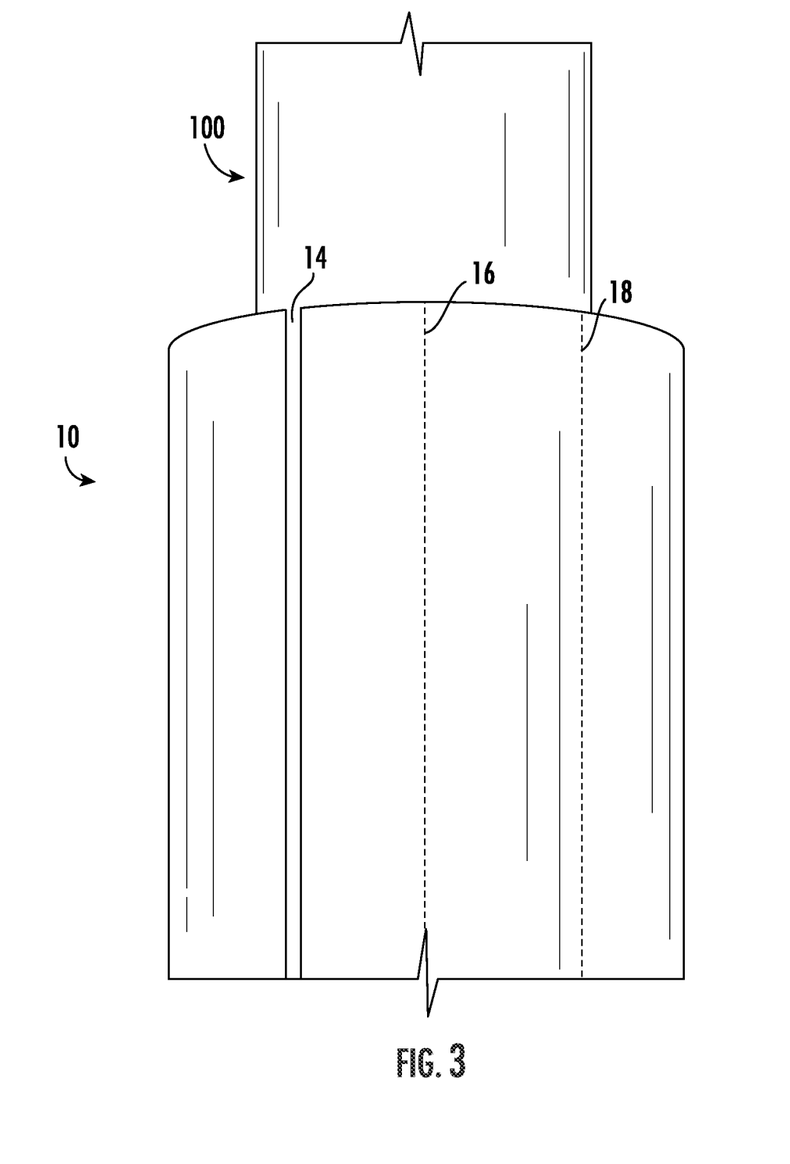
FIG. 3 is a front photographic view of the adjustable tubular pipe insulator of FIG. 2 installed around a one-inch pipe.
Figure 4:
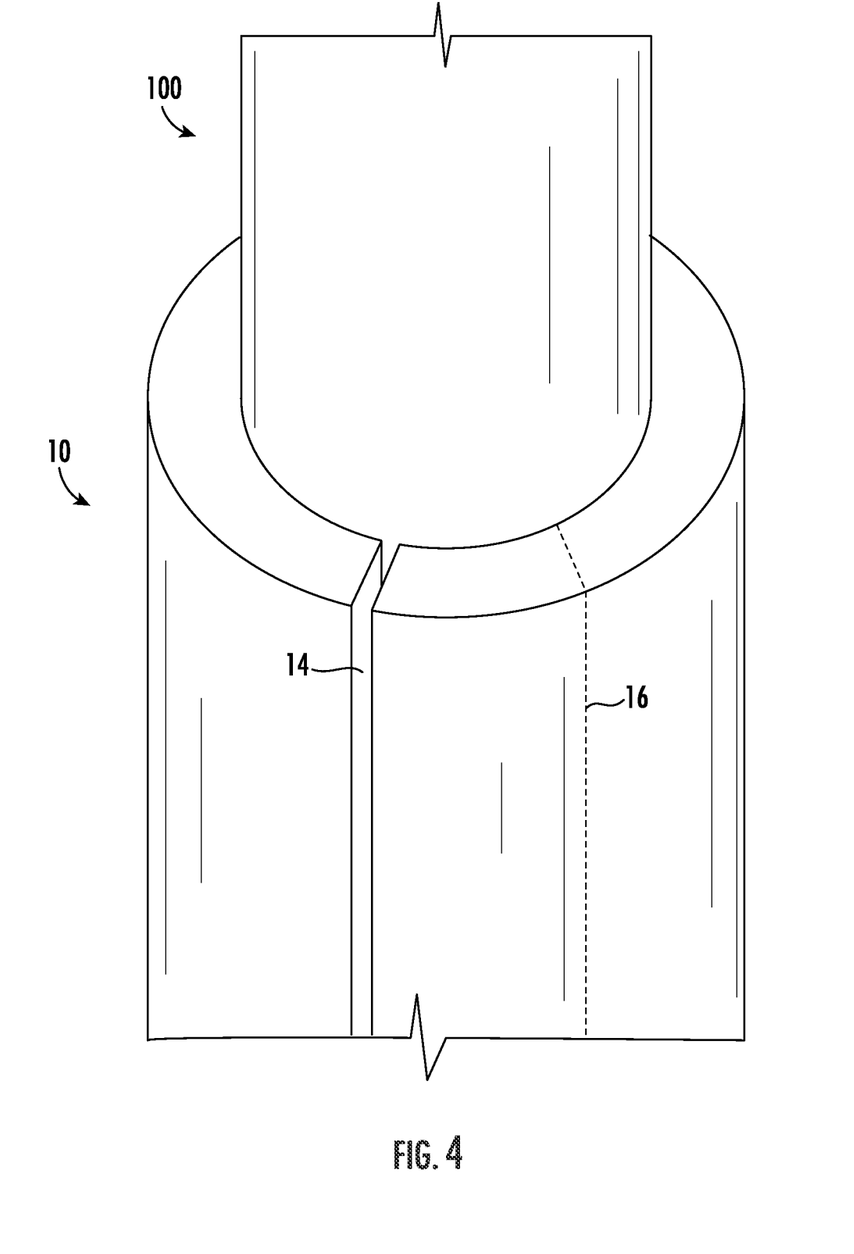
FIG. 4 is a perspective photographic view of the adjustable tubular pipe insulator of FIG. 2 installed around a one-inch pipe.

Referring specifically to FIGS. 3-4, the adjustable tubular pipe insulator 10 of FIG. 2 is installed around a one-inch pipe 100. Slit 14 may be used to install the insulator 10 around the pipe 100. Seams 16 and 18 provide tear points for selective removal of respective first and second strips 15 and 17.

Figure 5:
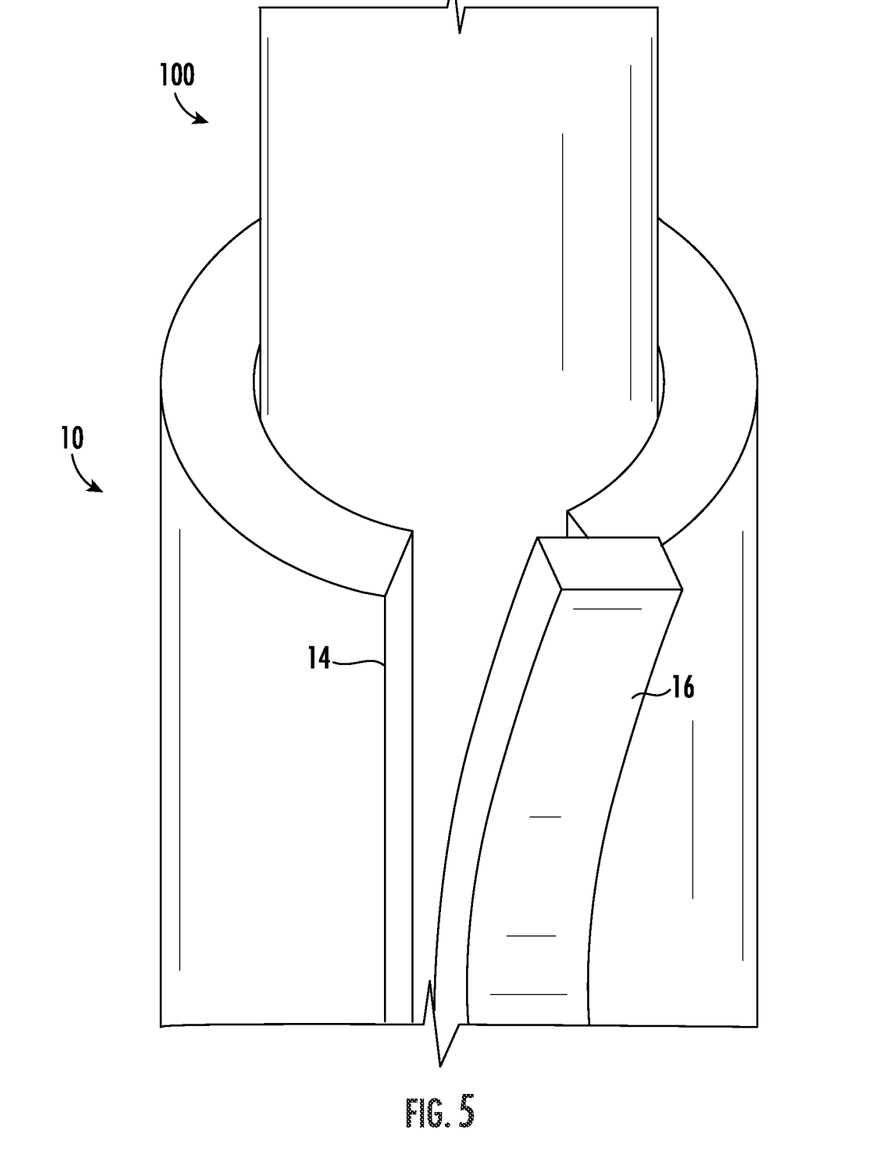
FIG. 5 is a perspective photographic view of the adjustable tubular pipe insulator of FIG. 2 installed around a ¾-inch pipe, with one strip of insulation partially removed to demonstrate adaptation to a smaller pipe.
Figure 6:
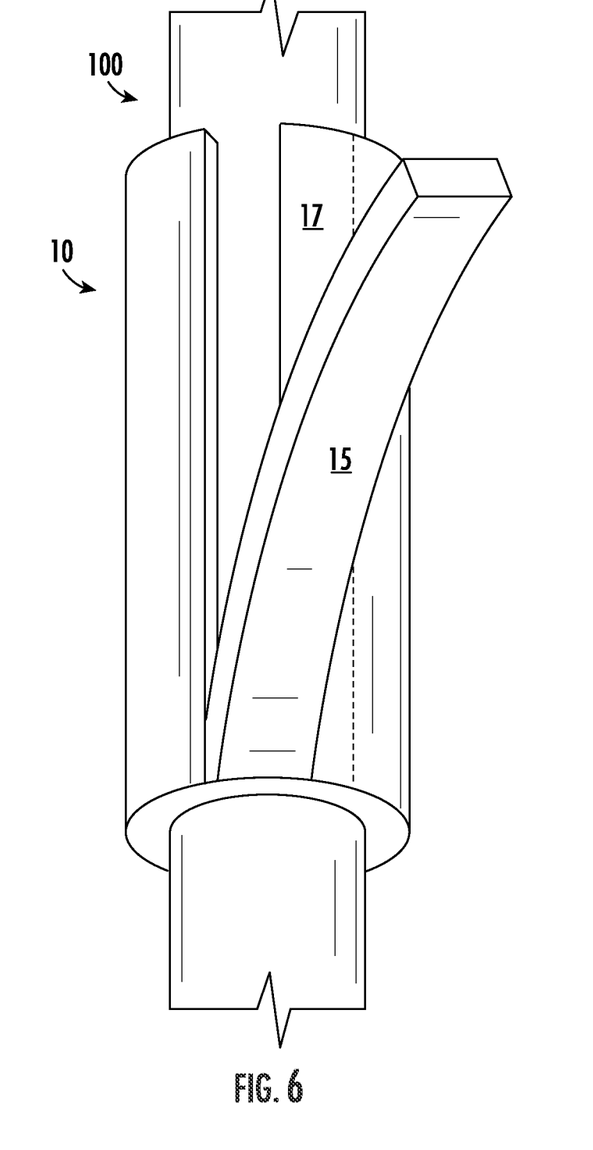
FIG. 6 is a front photographic view of the adjustable tubular pipe insulator of FIG. 2 installed around a ¾-inch pipe, with one strip of insulation partially removed to demonstrate adaptation to a smaller pipe.
Figure 7:
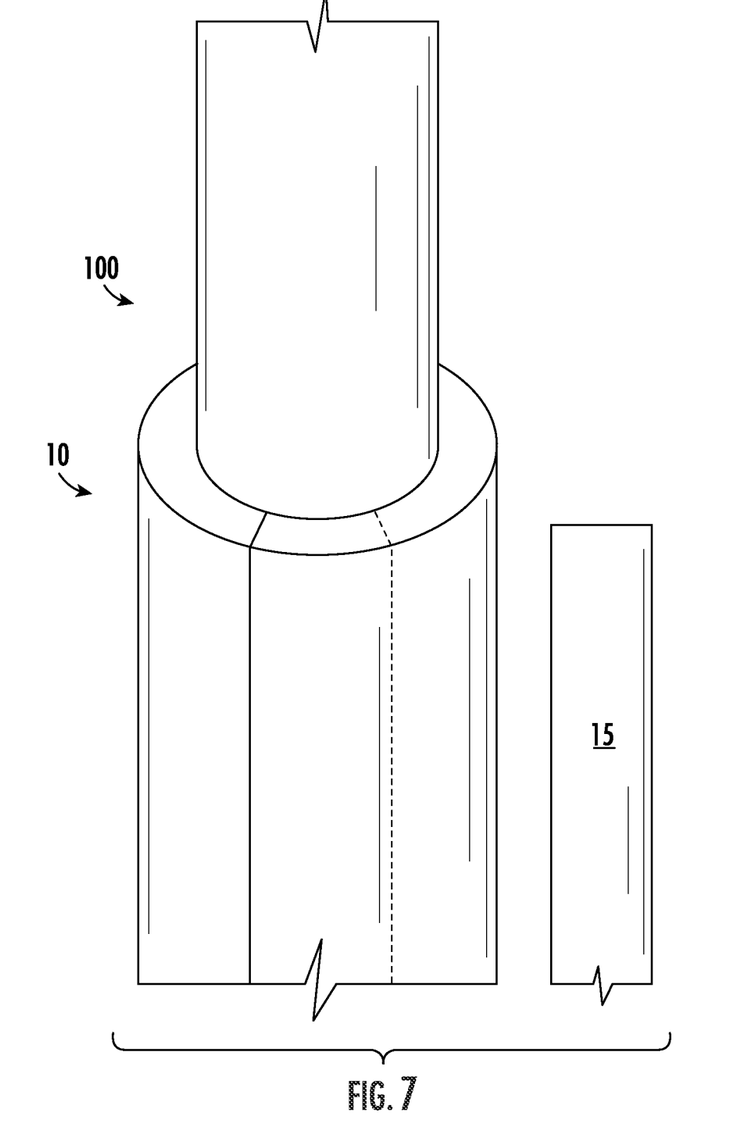
FIG. 7 is a perspective photographic view thereof, with the strip of insulation fully removed.
Figure 8:
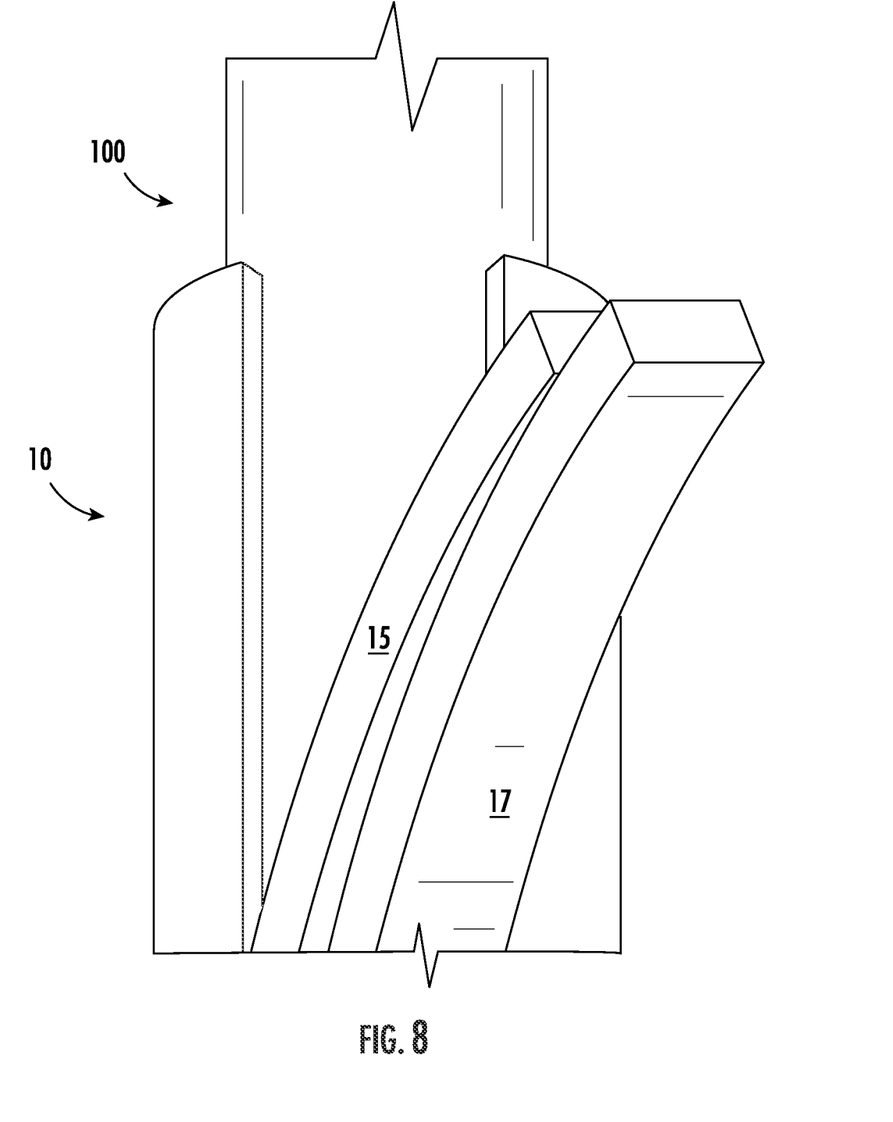
FIG. 8 is a perspective photographic view of the adjustable tubular pipe insulator of FIG. 2 installed around a ½-inch pipe, with two strips of insulation partially removed to demonstrate adaptation to a smaller pipe.
Figure 9:
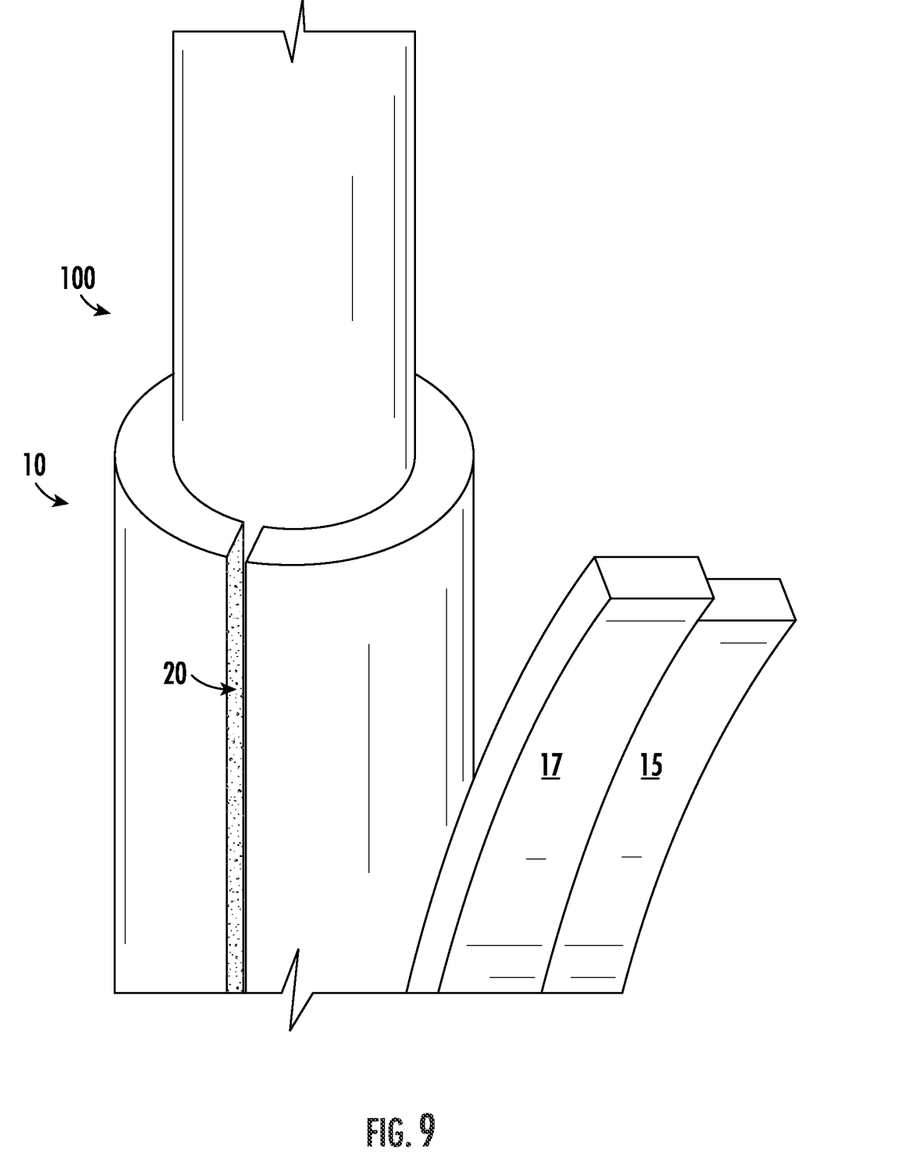
FIG. 9 is a perspective photographic view thereof, with the strips of insulation fully removed.

FIGS. 5-7 illustrate the tubular pipe insulator 10 of FIG. 2 installed around a ¾-inch pipe, with the first strip 15 of insulator 10 partially or fully removed for adaptation to a configuration for fitting around a smaller pipe 100, such as a 0.75 inch pipe. FIG. 8 illustrates the tubular pipe insulator 10 of FIG. 2 installed around a ½-inch pipe, with each of the first and second strips 15 and 17 of the insulator 10 being at least partially removed for adaptation to a smaller pipe 100, such as a 0.5-inch pipe. FIG. 9 illustrates the strips 15 and 17 of the insulator 10 fully removed.

The adjustable tubular pipe insulator 10 may be extruded to fit a 1-inch diameter pipe 100. The insulator 10 is extruded with a longitudinal slit 14 to allow the end user to open it up to insert the pipe 100. In some cases, an adhesive strip (not shown) is provided. The insulator 10 is provided with a plurality of longitudinal seams 16, 18 or perforations. The longitudinal seams may be spaced such that the end user may selectively tear away one or more strips 15, 17 of foam to adjust the insulator 10 to fit the desired size of pipe 100. This adjusted insulator 10 may fit more tightly against the pipe being protected, avoiding an air gap that will hamper the performance of the insulation.

Figure 10:
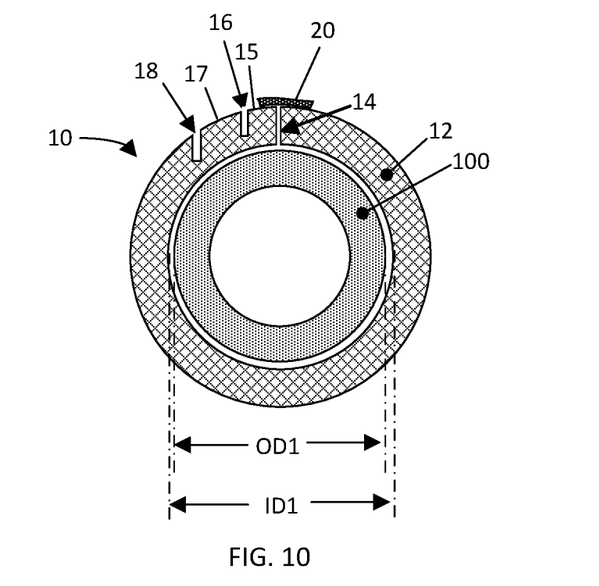
FIG. 10 is an end view illustrating the adjustable tubular pipe insulator with a first size pipe installed therein.

FIG. 10 is an end view illustrating the adjustable tubular pipe insulator 10 with a first size pipe 100 installed therein. In the implementations of FIGS. 10-13, the main body 12 of the adjustable tubular pipe insulator 10 has a longitudinal slit 14 and two longitudinal seams 16, 18, but, in contrast to the implementation of, for example, FIG. 1, the two longitudinal seams 16, 18, define differently-sized strips 15 and 17.

In contrast to the implementation of, for example, FIG. 7, the strips 15, 17 are not tapered inwardly but have a substantially uniform width from top to bottom, that is, approximately the same width from the outer circumference to the bottom of the seams 16, 18.

In an implementation: the main body 12 has a thickness of approximately ⅜ inch, a width (or outer circumference) of approximately 6¼ inches, an inner diameter of approximately 1⅛ inches, and a length of approximately 36 inches.

In another implementation the main body 12 has a thickness between ¼ inch and ¾ inch.

In another implementation the main body 12 has a thickness between ⅜ inch and ½ inch.

In a preferred implementation, the seam 16 is approximately ½ inch from the longitudinal slit 14, and defines a strip 15 which is approximately ½ inch wide, and the seam 18 is approximately ⅝ inch from the seam 16, that is, approximately ⅝ inch further from the longitudinal slit 14, that is, the seam 18 is approximately 1⅛ inch from the longitudinal slit 14, and defines a strip 17 which is approximately ⅝ inch wide.

In another implementation, the seam 16 is approximately ¾ inch from the longitudinal slit 14, and defines a strip 15 which is approximately ¾ inch wide; and the seam 18 is approximately ½ inch from the seam 16, that is, approximately ½ inch further from the longitudinal slit 14, and defines a strip 17 which is approximately ½ inch wide.

In another implementation, the seam 16 is approximately ½ inch from the longitudinal slit 14, and defines a strip 15 which is approximately ½ inch wide; and the seam 18 is approximately ¾ inch from the seam 16, that is, approximately ¾ inch further from the longitudinal slit 14, and defines a strip 17 which is approximately ¾ inch wide. This implementation might be used, for example, where the pipe 100 is so small that a strip 17 having a width of ¾ inch better engages the pipe 100 than a width of ½ inch.

Figure 17:
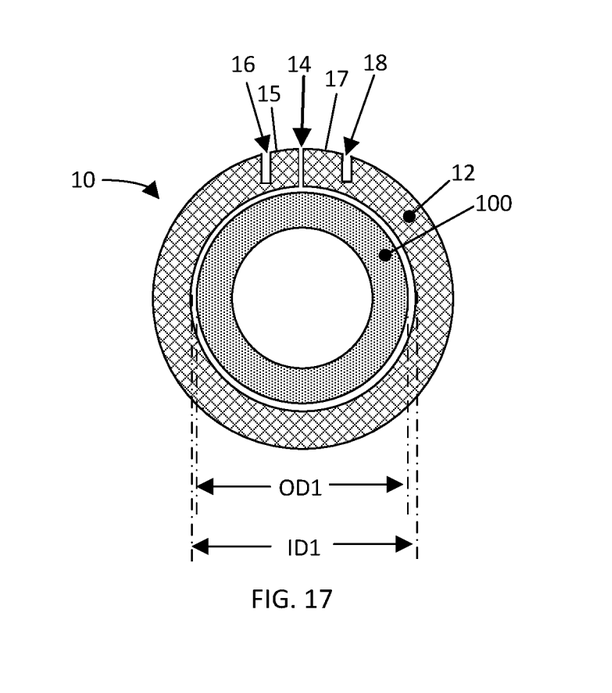
FIG. 17 is an end view illustrating an alternative implementation of the adjustable tubular pipe insulator.

FIG. 17 is an end view illustrating an alternative implementation of the adjustable tubular pipe insulator. In this implementation the seam 16 is a first distance in a first direction from the longitudinal slit 14, and the seam 18 is a second, different distance in a second, opposite direction from the longitudinal slit 14. For example, the seam 16 is approximately ½ inch from the longitudinal slit 14 in a counterclockwise direction, and the seam 18 is approximately ⅝ inch from the longitudinal slit 14 in a clockwise direction.

Different seam 16, 18 locations may be used, or even preferable, for different pipe sizes and/or different insulation thicknesses. For example, if the insulation thickness is increased to ½ inch, then the distances of the seams 16, 18 from the longitudinal slit 14 will preferably be slightly increased, e.g., ⅛ inch to ¼ inch larger, than the distances of the seams 16, 18 for an insulation thickness of ⅜ inch. It should be noticed that a change of ⅛ inch to each of these distances provides a total movement of ¼ inch of the seam 16 with respect to the longitudinal slit 14.

In an implementation, the strip 15 is wider than the strip 17.

In another implementation, the strip 17 is wider than the strip 15.

The width and thickness of the main body 12 define a first inner diameter ID1. The first size pipe 100 has a first outer diameter OD1. Preferably the first outer diameter OD1 is approximately the same as, or only slightly smaller than, the first inner diameter ID1, so that the pipe 100 fits snugly within the adjustable tubular pipe insulator 10 to provide the best insulating characteristics. A small gap is shown between the pipe 100 and the adjustable tubular pipe insulator 10 in FIGS. 10-15 for clarity of illustration. Also shown is an optional adhesive strip 20 which may be used to seal the longitudinal slit 14 after the adjustable tubular pipe insulator 10 is installed over the pipe 100.

Figure 11:
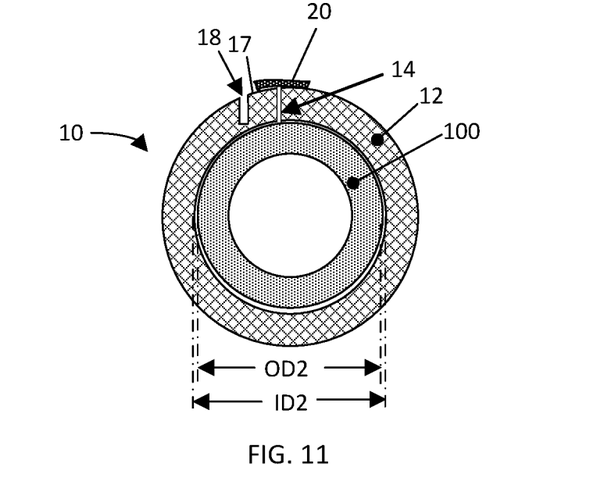
FIG. 11 is an end view illustrating the adjustable tubular pipe insulator with a smaller size pipe installed therein.

FIG. 11 is an end view illustrating the adjustable tubular pipe insulator 10 with a smaller size pipe 100 installed therein. The strip 15 has been detached at the seam 16 and removed. Also shown is an optional adhesive strip 20 which may be used to seal the adjustable tubular pipe insulator 10 after removal of the strip 15.

Figure 12:
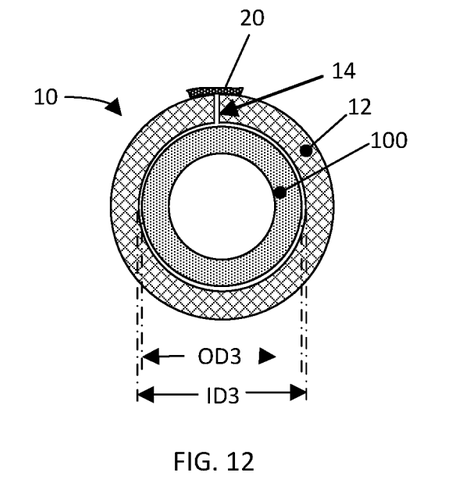
FIG. 12 is an end view illustrating the adjustable tubular pipe insulator with another smaller size pipe installed therein.

FIG. 12 is an end view illustrating the adjustable tubular pipe insulator 10 with another smaller size pipe 100 installed therein. Both strips 15 and 17 have been detached at the respective seams 16 and 18, and removed. Also shown is an optional adhesive strip 20 which may be used to seal the adjustable tubular pipe insulator 10 after removal of both strips 15 and 17.

Figure 13:
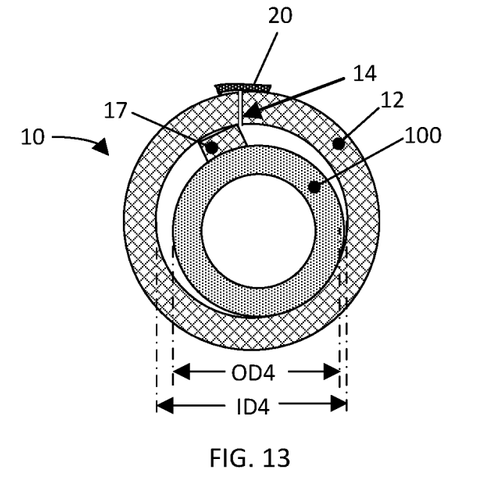
FIG. 13 is an end view illustrating the adjustable tubular pipe insulator with another smaller size pipe installed therein.

FIG. 13 is an end view illustrating the adjustable tubular pipe insulator 10 with another smaller size pipe 100 installed therein. The strip 15 has been detached at the seam 16. The strip 15 may then be discarded or used as in FIGS. 14 and 15. Also, the strip 17 in positioned inside the main body 12.

In an implementation the strip 17 has been detached at the seam 18 and repositioned inside the main body 12. This, however, has the disadvantage that the strip 17 may be lost or extra effort required to hold the strip 17 in place while the main body 10 is positioned around the pipe 100.

Preferably, however, the strip 17 is not detached at the seam 18, but is rotated inwardly at the seam 18 to reposition it inside the main body 12. This maintains the unity of the main body 12 and the strip 17 so that the strip 17 does not become lost, and is easier to maintain in place while the main body 10 is positioned around the pipe 100.

Figure 14:
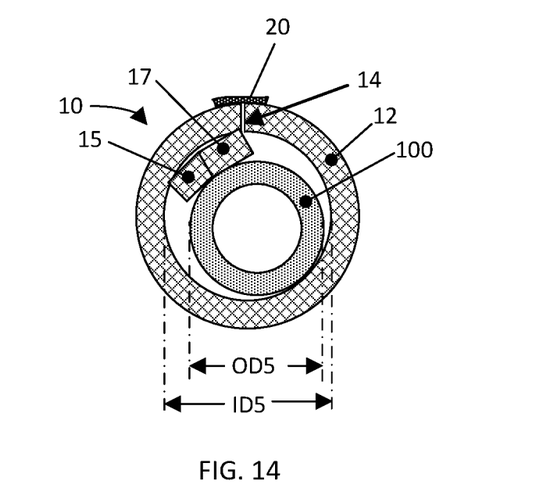
FIG. 14 is an end view illustrating the adjustable tubular pipe insulator with another smaller size pipe installed therein.

FIG. 14 is an end view illustrating the adjustable tubular pipe insulator 10 with another smaller size pipe 100 installed therein. The strips 15 and 17 have preferably been rotated inwardly at the seam 18, which maintains the unity of the strips 15, 17 and the main body 12, and repositioned inside the main body 12. Alternatively, one or both of the strips 15, 17 may be detached and then repositioned inside the main body 12. This alternative has the disadvantage, however, that the strips 15, 17 may become lost or required additional effort to maintain in place while the main body 10 is positioned around the pipe 100.

Figure 15:
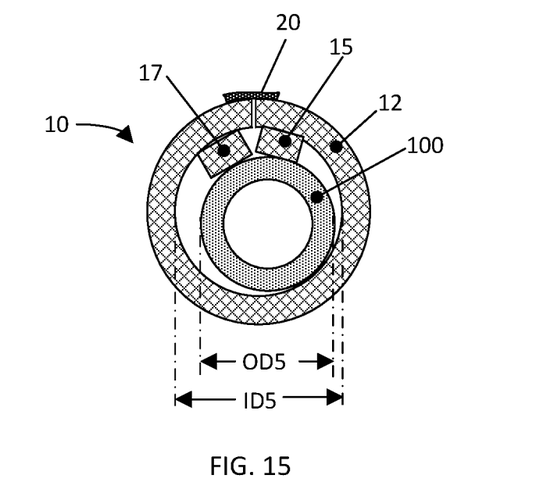
FIG. 15 is an end view illustrating an alternative implementation of the adjustable tubular pipe insulator with another smaller size pipe installed therein.

FIG. 15 is an end view illustrating an alternative implementation of the adjustable tubular pipe insulator 10 with another smaller size pipe 100 installed therein. At least strip 15 has been detached at its seam 16, and then the strips 15, 17 are repositioned inside the main body 12.

In FIGS. 13-15, repositioning the strips 15 and/or 17 inside the main body 12 provides for the adjustable tubular pipe insulator 10 to wrap around the pipe 100 more securely than if the strips 15 and/or 17 were not so repositioned, and also reduces the volume in which air can circulate within the adjustable tubular pipe insulator 10, thereby improving the insulating quality of the adjustable tubular pipe insulator 10.

Also shown in FIGS. 10-15 is an optional adhesive strip 20 which may be used to seal the adjustable tubular pipe insulator 10 after removal or repositioning of the strips 15 and/or 17.

Figure 16:
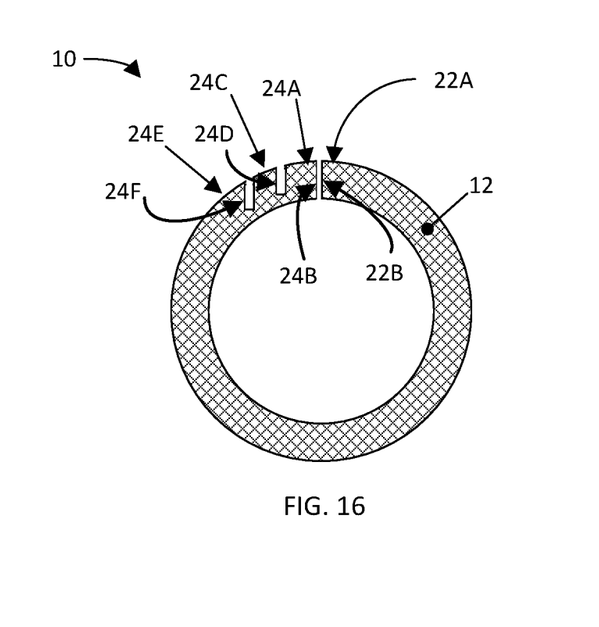
FIG. 16 is an end view defining certain surfaces on the adjustable tubular pipe insulator.

FIG. 16 is an end view defining certain surfaces on the adjustable tubular pipe insulator 10. The term "end" as used herein, may refer to one of several different surfaces. For example: the optional adhesive strip 20 would be fastened to end 22A and to end 24A if no strip 15, 17 is detached and/or repositioned; the optional adhesive strip 20 would be fastened to end 24C if strip 15 is detached and/or repositioned; or the optional adhesive strip 20 would be fastened to end 24E if both strips 15 and 17 are detached and/or repositioned. Also, for example: end 22B may be positioned against end 24B to close the adjustable tubular pipe insulator 10 if no strip 15, 17 is detached and/or repositioned; end 22B may be positioned against end 24D if strip 15 is detached and/or repositioned; or end 22B may be positioned against end 24F if both strips 15 and 17 are detached and/or repositioned. Further, the adjustable tubular pipe insulator 10 will have an end surface at each longitudinal end of the main body 12. One of ordinary skill in the art would know what "end" is being referred to by the context of the sentence using that term and/or the referenced Figure.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. For brevity and/or clarity, well-known functions or constructions may not be described in detail herein.

The terms "for example" and "such as" mean "by way of example and not of limitation." The subject matter described herein is provided by way of illustration for the purposes of teaching, suggesting, and describing, and not limiting or restricting. Combinations and alternatives to the illustrated embodiments are contemplated, described herein, and set forth in the claims.

For convenience of discussion herein, when there is more than one of a component, that component may be referred to herein either collectively or singularly by the singular reference numeral unless expressly stated otherwise or the context clearly indicates otherwise. For example, components N (plural) or component N (singular) may be used unless a specific component is intended. Also, the singular forms "a," "an," and "the" are intended to include the plural forms as well, unless expressly stated otherwise or the context indicates otherwise.

It will be further understood that the terms "includes," "comprises," "including," and/or "comprising" specify the presence of stated features, steps, operations, elements, and/or components, but do not preclude the presence or addition of one or more other features, steps, operations, elements, components, and/or groups thereof unless explicitly stated otherwise or the context clearly requires otherwise. The terms "includes," "has" or "having" or variations in form thereof are intended to be inclusive in a manner similar to the term "comprises" as that term is interpreted when employed as a transitional word in a claim.

It will be understood that when a component is referred to as being "connected" or "coupled" to another component, it can be directly connected or coupled or coupled by one or more intervening components unless expressly stated otherwise or the context clearly indicates otherwise.

The term "and/or" includes any and all combinations of one or more of the associated listed items. As used herein, phrases such as "between X and Y" and "between about X and Y" should be interpreted to include X and Y unless expressly stated otherwise or the context clearly indicates otherwise.

Terms such as "about", "approximately", and "substantially" are relative terms and indicate that, although two values may not be identical, their difference is such that the apparatus or method still provides the indicated or desired result, or that the operation of a device or method is not adversely affected to the point where it cannot perform its intended purpose. As an example, and not as a limitation, if a height of "approximately X inches" is recited, a lower or higher height is still "approximately X inches" if the desired function can still be performed or the desired result can still be achieved.

While the terms vertical, horizontal, upper, lower, bottom, top, and the like may be used herein, it is to be understood that these terms are used for ease in referencing the drawing and, unless otherwise indicated or required by context, does not denote a required orientation.

The different advantages and benefits disclosed and/or provided by the implementation(s) disclosed herein may be used individually or in combination with one, some or possibly even all of the other benefits. Furthermore, not every implementation, nor every component of an implementation, is necessarily required to obtain, or necessarily required to provide, one or more of the advantages and benefits of the implementation.

Conditional language, such as, among others, "can", "could", "might", or "may", unless specifically stated otherwise, or otherwise understood within the context as used, is generally intended to convey that certain embodiments preferably or optionally include certain features, elements and/or steps, while some other embodiments optionally do not include those certain features, elements and/or steps. Thus, such conditional language indicates, in general, that those features, elements and/or step may not be required for every implementation or embodiment.

The subject matter described herein is provided by way of illustration only and should not be construed as limiting the nature and scope of the subject invention. While examples of aspects of the subject invention have been provided above, it is not possible to describe every conceivable combination of components or methodologies for implementing the subject invention, and one of ordinary skill in the art may recognize that further combinations and permutations of the subject invention are possible. Furthermore, the subject invention is not necessarily limited to implementations that solve any or all disadvantages which may have been noted in any part of this disclosure. Various modifications and changes may be made to the subject invention described herein without following, or departing from the spirit and scope of, the exemplary embodiments and applications illustrated and described herein. Although the subject matter presented herein has been described in language specific to components used therein, it is to be understood that the subject invention is not necessarily limited to the specific components or characteristics thereof described herein; rather, the specific components and characteristics thereof are disclosed as example forms of implementing the subject invention. Accordingly, the disclosed subject matter is intended to embrace all alterations, modifications, and variations, that fall within the scope and spirit of any claims that are written, or may be written, for the subject invention.

While the present invention has been shown and described in accordance with several preferred and practical embodiments, it is recognized that departures from the instant disclosure are contemplated within the spirit and scope of the present invention.

What is claimed is:

1. An adjustable tubular insulator comprising:
a body having a width, a thickness, a length, and a longitudinal slit extending the length of the body, the width and the thickness defining a first inner diameter, the body being sized and configured for engaged receipt of a first pipe size having first outer diameter; and
first and second longitudinal seams along the body, the first longitudinal seam being a first predetermined distance from the longitudinal slit, the second longitudinal seam being a second predetermined distance from the longitudinal slit, the first and second longitudinal seams demarking first and second detachable insulator strips having different predetermined widths;
wherein the body is sized and configured for engaged receipt of a second pipe size when one or both of the detachable insulator strips is removed, the second pipe size having an outer diameter less than the first outer diameter.

2. The adjustable tubular insulator of claim 1 wherein the first detachable insulator strip has a width and the second detachable insulator strip has a second, smaller width.

3. The adjustable tubular insulator of claim 1 wherein at least one of the first detachable insulator strip or the second detachable insulator strip has a substantially uniform width.

4. The adjustable tubular insulator of claim 1 wherein:
the first predetermined distance is ½ inch from the longitudinal slit in a first direction; and
the second predetermined distance is ⅝ inch from first longitudinal seam in the first direction.

5. The adjustable tubular insulator of claim 1:
wherein the body has a second inner diameter when the first detachable insulator strip is detached from the body, the second inner diameter being smaller than the first inner diameter; and
wherein the body accommodates a third pipe size when the first detachable insulator strip is repositioned inside the body, the third pipe size having an outer diameter less than the second inner diameter of the body.

6. The adjustable tubular insulator of claim 1:
wherein the body has a second inner diameter when both the first detachable insulator strip and the second detachable insulator strip are detached from the body, the second inner diameter being smaller than the first inner diameter; and
wherein the body accommodates a third pipe size when one of the first detachable insulator strip or the second detachable insulator strip is repositioned inside the body, the third pipe size having an outer diameter less than the second inner diameter of the body.

7. The adjustable tubular insulator of claim 1:
wherein the body has a second inner diameter when both the first detachable insulator strip and the second detachable insulator strip are detached from the body, the second inner diameter being smaller than the first inner diameter; and
wherein the body accommodates a third pipe size when both the first detachable insulator strip and the second detachable insulator strip are repositioned inside the body, the third pipe size having an outer diameter less than the second inner diameter of the body.

8. The adjustable tubular insulator of claim 1 wherein the longitudinal slit defines a first end and a second end of the body, and further comprising an adhesive strip for securing the first end of the body to a different part of the body.

9. The adjustable tubular insulator of claim 1 wherein the thickness is between ¼ inch and ¾ inch.

10. The adjustable tubular insulator of claim 1 wherein the body is formed from foam.

11. An adjustable tubular insulator comprising:
a body having a width, a thickness, a length, and a longitudinal slit extending the length of the body, the width and the thickness defining a first inner diameter, the body being sized and configured for engaged receipt of a first pipe size having first outer diameter; and
first and second longitudinal seams along the body, the first longitudinal seam being a first predetermined distance from the longitudinal slit, the second longitudinal seam being a second predetermined distance from the longitudinal slit, the first and second longitudinal seams demarking first and second detachable insulator strips having different predetermined widths;
wherein the body is sized and configured for engaged receipt of a second pipe size when one or both of the detachable insulator strips is repositioned inside the body without being detached from the body, the second pipe size having an outer diameter less than the first outer diameter.

12. The adjustable tubular insulator of claim 11 wherein the first detachable insulator strip has a first width and the second detachable insulator strip has a second, smaller width.

13. The adjustable tubular insulator of claim 11 wherein at least one of the first detachable insulator strip or the second detachable insulator strip has a substantially uniform width.

14. The adjustable tubular insulator of claim 11 wherein:
the first predetermined distance is ½ inch from the longitudinal slit in a first direction; and
the second predetermined distance is ⅝ inch from first longitudinal seam in the first direction.

15. The adjustable tubular insulator of claim 11:
wherein the body accommodates a third pipe size when the first detachable insulator strip is folded to reposition it inside the body, the third pipe size having an outer diameter less than the first outer diameter.

16. The adjustable tubular insulator of claim 11:
wherein the body accommodates a third pipe size when both the first detachable insulator strip and the second detachable insulator strip are folded to reposition them inside the body, the third pipe size having an outer diameter less than the first outer diameter.

17. The adjustable tubular insulator of claim 11 wherein the longitudinal slit defines a first end and a second end of the body, and further comprising an adhesive strip for securing the first end of the body to a different part of the body.

18. The adjustable tubular insulator of claim 11 wherein the thickness is between ¼ inch and ¾ inch.

19. The adjustable tubular insulator of claim 11 wherein the body is formed from foam.

20. An adjustable tubular insulator comprising:

a foam body having a width, a thickness between ¼ inch and ¾ inch, a length, and a longitudinal slit extending the length of the body, the width and the thickness defining a first inner diameter, the body being sized and configured for engaged receipt of a first pipe size having first outer diameter; and first and second longitudinal seams along the body, the first longitudinal seam being a first predetermined distance from the longitudinal slit, the second longitudinal seam being a second, greater predetermined distance from the longitudinal slit, the first longitudinal seam demarking a first detachable insulator strip having a substantially uniform first width, and the second longitudinal seam demarking a second detachable insulator strip having a smaller, substantially uniform, second width;

wherein the body is sized and configured for engaged receipt of a second pipe size when one or both of the detachable insulator strips is repositioned inside the body without being detached from the body, the second pipe size having an outer diameter less than the first outer diameter.

* * * * *